(12) United States Patent
George et al.

(10) Patent No.: US 7,165,355 B2
(45) Date of Patent: Jan. 23, 2007

(54) DEVICE FOR CATCHING INSECTS

(76) Inventors: David Michael George, 1916 Yukon Dr., Bolingbrook, IL (US) 60490; Ryan Bruce Johnson, 604 N. Des Plaines, Apt. 1E, Plainfield, IL (US) 60544

( * ) Notice: Subject to any disclaimer, the term of this patent is extended or adjusted under 35 U.S.C. 154(b) by 0 days.

(21) Appl. No.: 10/919,143

(22) Filed: Aug. 16, 2004

(65) Prior Publication Data
US 2006/0032112 A1 Feb. 16, 2006

(51) Int. Cl.
*A01M 3/04* (2006.01)

(52) U.S. Cl. .............................. 43/136; 43/135; 43/137

(58) Field of Classification Search ................. 43/134, 43/135, 136, 137, 133; 294/103.1, 1.3
See application file for complete search history.

(56) References Cited

U.S. PATENT DOCUMENTS

| | | | |
|---|---|---|---|
| 173,258 A | | 1/1876 | Blauvelt |
| 213,105 A | * | 3/1879 | Greenwood ................... 56/333 |
| 382,580 A | * | 5/1888 | Wilmot ........................ 43/136 |
| 502,056 A | | 7/1893 | Teate |
| 1,081,364 A | | 12/1913 | Chapman |
| 1,099,342 A | | 6/1914 | Copenhaver |
| 1,155,697 A | * | 10/1915 | Anderson .................... 43/135 |
| 1,174,733 A | | 3/1916 | Kelly |
| 1,356,371 A | * | 10/1920 | Jolly .......................... 43/135 |
| 1,631,864 A | * | 6/1927 | Hendrickson et al. ......... 43/137 |
| 1,664,762 A | | 4/1928 | Voss |
| 1,750,163 A | * | 3/1930 | Lambert ...................... 43/134 |
| 1,861,688 A | * | 6/1932 | Crawford .................... 43/135 |
| 2,189,360 A | | 2/1940 | Haviland |
| 2,191,126 A | | 2/1940 | Gustke |
| 2,434,364 A | | 1/1948 | Linding |
| 2,496,415 A | | 2/1950 | Sharpe |
| 2,697,895 A | * | 12/1954 | King ........................... 43/137 |
| 3,292,299 A | | 12/1966 | Mettler |
| 3,308,571 A | | 3/1967 | Jones |
| 3,648,402 A | | 3/1972 | Siggers |
| 3,871,125 A | | 3/1975 | Wilson et al. |
| 3,996,690 A | | 12/1976 | Ridings |
| 4,089,132 A | | 5/1978 | McLaughlin |
| 4,174,586 A | | 11/1979 | Burzdak |

(Continued)

OTHER PUBLICATIONS

Whitmire Micro-Gen Research Laboratories Material Safety Data Sheet, regarding SensorTM Yellow Monitoring Cards.

(Continued)

*Primary Examiner*—Kurt Rowan
(74) *Attorney, Agent, or Firm*—Ryndak & Suri LLP

(57) ABSTRACT

A device for catching insects is provided which includes an elongated member with first and second distal portions, an insect trapping head mounted on the first distal portion, and an actuating mechanism. The insect trapping head includes a first member and a second member pivotally mounted with respect to each other such that one of the members is moveable from about 0 to about 340 degrees relative to the other member, and preferably to about 270 degrees relative to the other member by activation of the actuating mechanism. When in the closed position, the first and second members define a rigid compartment such that the insect can be trapped between the first and second members. Preferably, a sticky surface on at least a portion of the interior of the compartment maintains the insects within the compartment.

14 Claims, 4 Drawing Sheets

U.S. PATENT DOCUMENTS

| | | |
|---|---|---|
| D269,796 S | 7/1983 | Stringfellow |
| 4,450,649 A | 5/1984 | Dunwoody |
| 4,617,754 A | 10/1986 | Miley |
| 4,759,150 A * | 7/1988 | Pierce .......................... 43/136 |
| 4,850,133 A * | 7/1989 | Burzdak et al. .............. 43/136 |
| 4,905,408 A * | 3/1990 | Wu ............................. 43/137 |
| D311,050 S | 10/1990 | Lisitza |
| 5,027,549 A | 7/1991 | Person |
| 5,058,314 A * | 10/1991 | Frascone ..................... 43/136 |
| 5,207,018 A | 5/1993 | Reaver et al. |
| 5,269,092 A | 12/1993 | Cobble |
| 5,634,293 A | 6/1997 | Mike et al. |
| 6,067,746 A * | 5/2000 | Kistner et al. ................ 43/136 |
| 6,185,862 B1 | 2/2001 | Nelson |
| 6,279,262 B1 | 8/2001 | Walkemeyer |
| 6,651,379 B1 | 11/2003 | Nelson |

OTHER PUBLICATIONS

Whitmire Micro-Gen Research Laboratories Technical Guide for using Sensor Monitoring Cards.

* cited by examiner

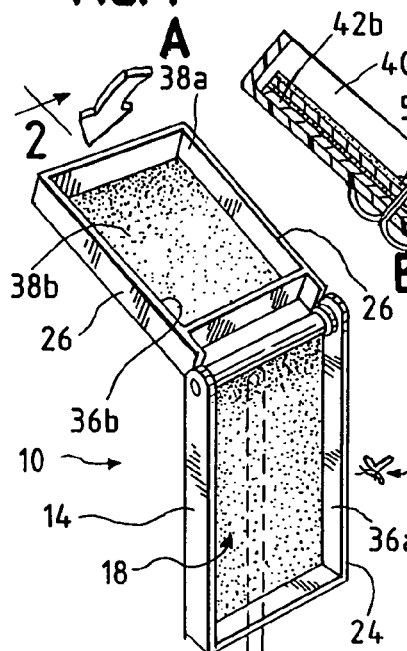
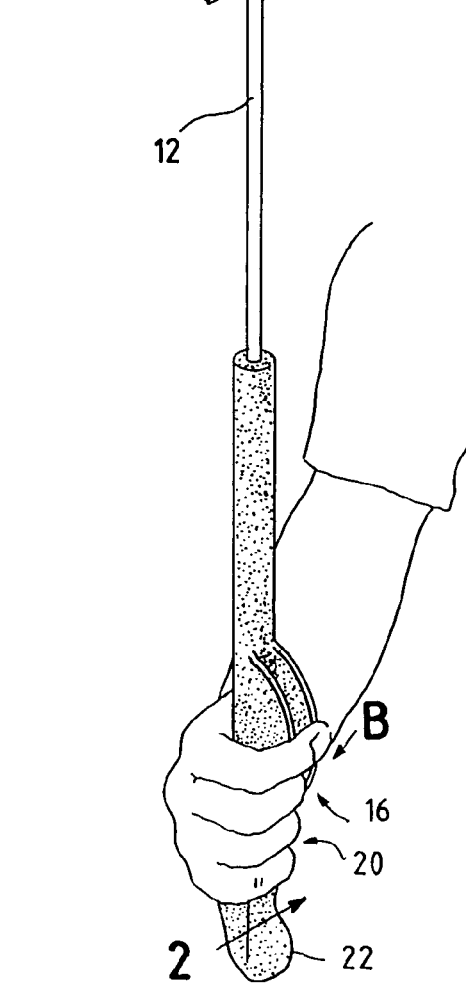
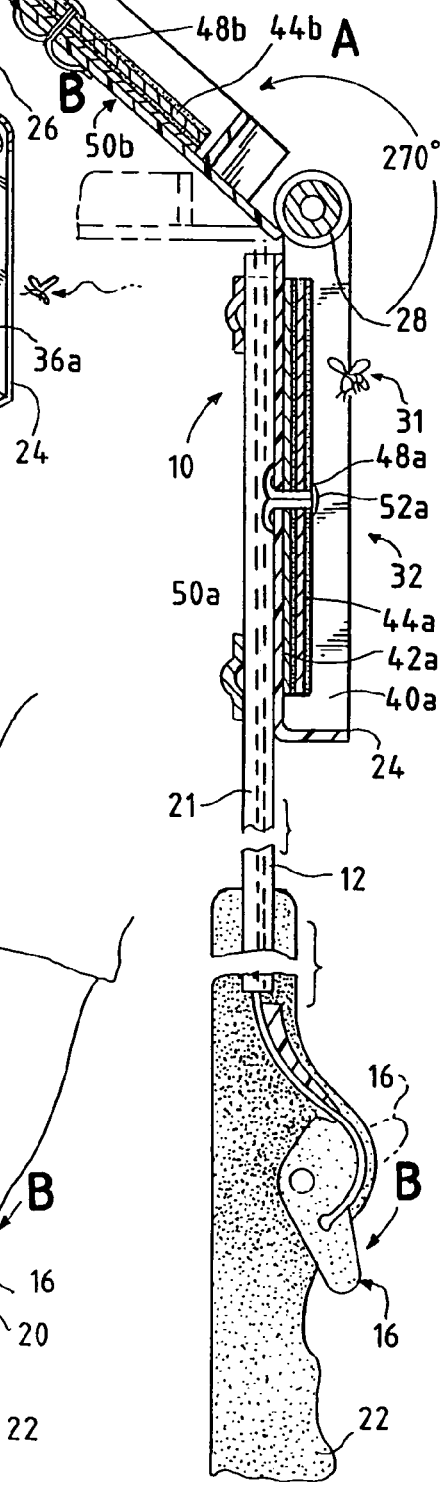
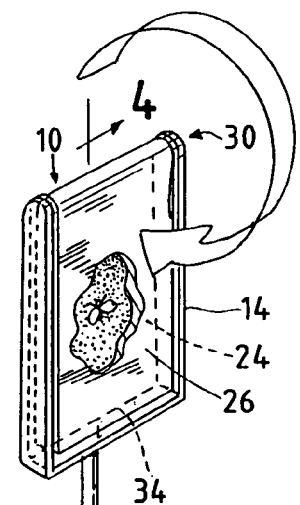
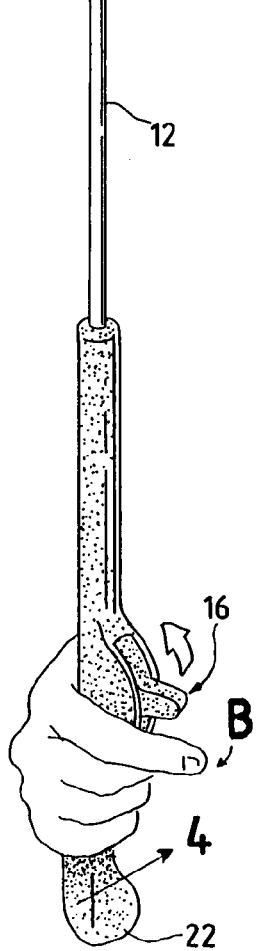

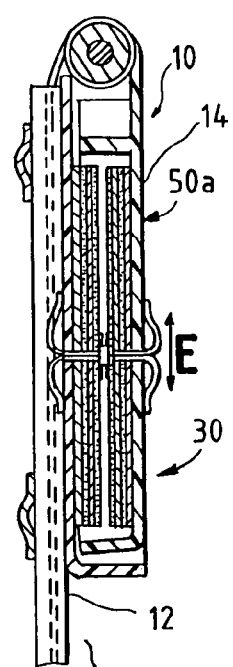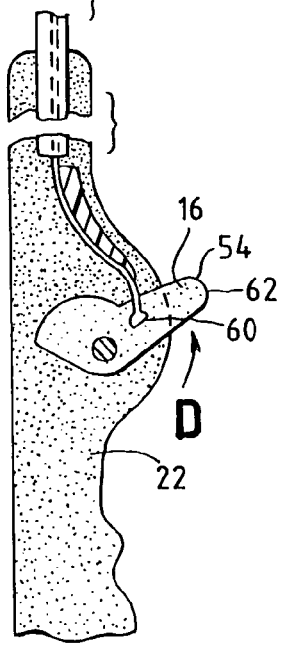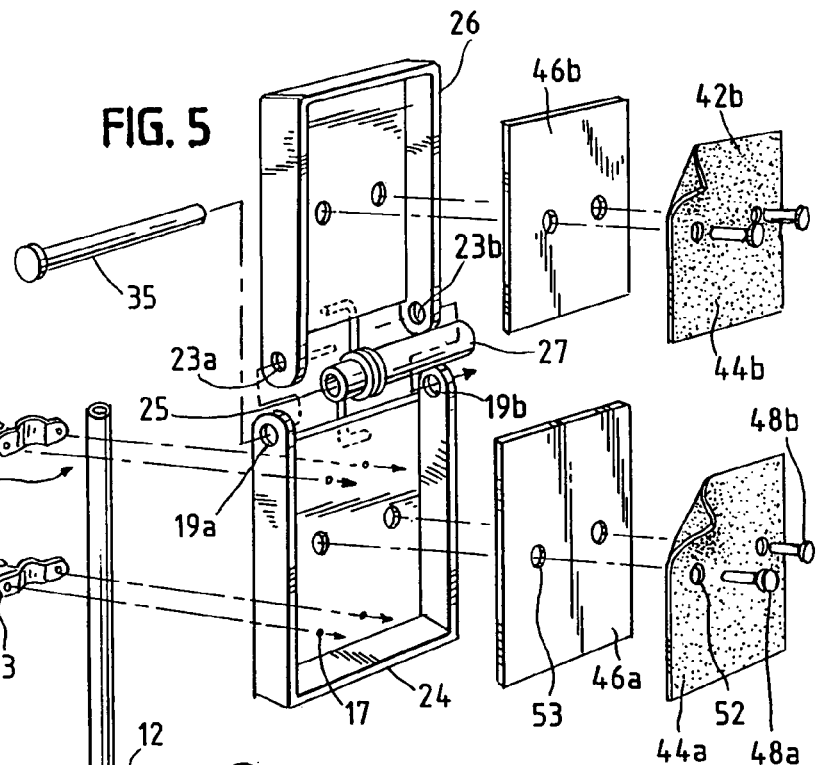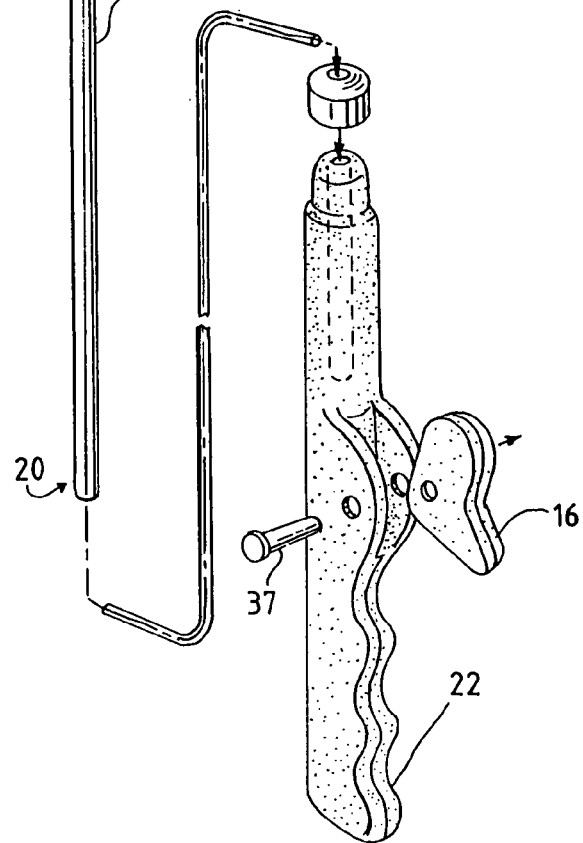

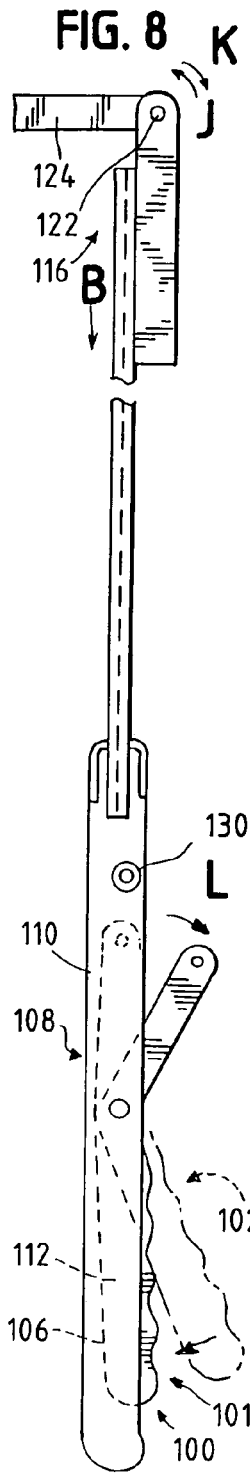
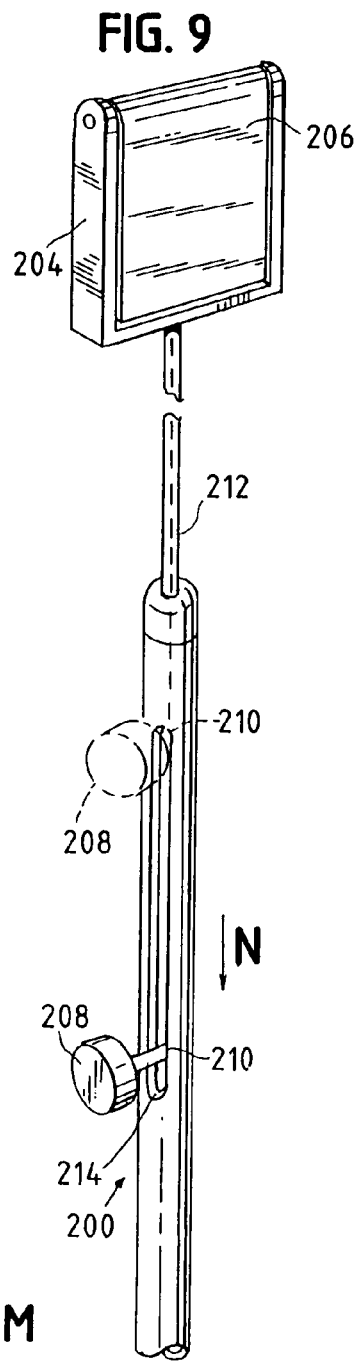
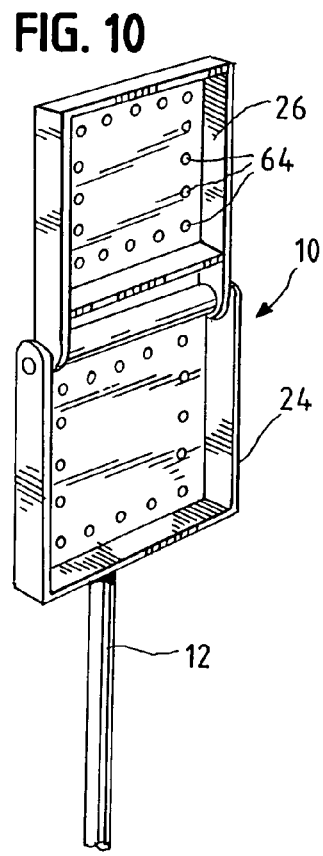
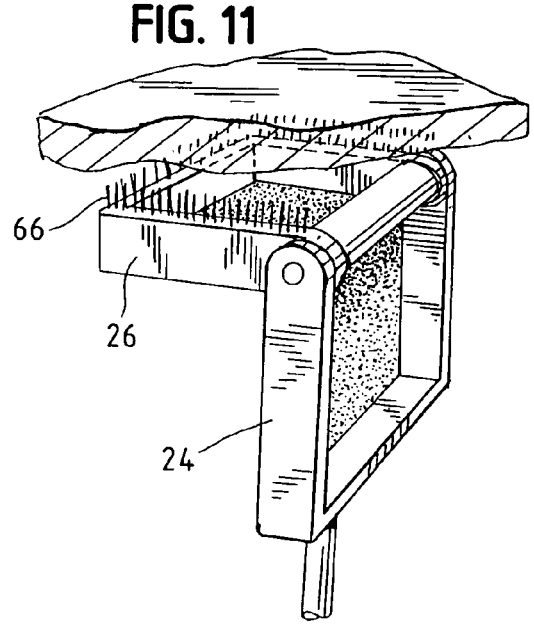

DEVICE FOR CATCHING INSECTS

FIELD OF THE INVENTION

The present invention relates to an improved device for catching and trapping insects in flight or resting on a surface.

BACKGROUND OF THE INVENTION

Bees, hornets, fruit flies, mosquitoes and numerous other insects can be a nuisance in any outdoor or indoor setting. Such pests often make individuals feel uncomfortable and may even be hazardous to certain individuals. Conventional fly swatters are often ineffective in catching or killing insects because the norm is to wait endlessly for the insect to land on a planar surface, such as a window, wall, or table before attacking the pest. Further, known fly swatters and other known insect catching devices require one to kill the insect by smashing the insect against the surface or by crushing the insect within the device. As a result, the killing of an insect or insects using known devices leaves an unsightly and unsanitary residue on either or both of the device and the killing surface. The user is then required to handle the insect or residues thereof and/or clean the surface. This cleaning step is inefficient, unpleasant, and can also be especially dangerous when dealing with stinging insects. As a result, there is a need for an efficient, easy to use insect trapping device for capturing a plurality of different insects.

SUMMARY OF THE INVENTION

In accordance with the present invention, there is provided a versatile and easy to use device for catching insects in a variety of settings. The device comprises an elongated member having a first and a second distal portion. An insect trapping head is mounted on the first distal portion and includes a first member and a second member pivotally mounted with respect to each other, preferably by a spring hinge. The first and second members are moveable between one of an open or closed position and the other of an open or closed position by an actuating mechanism. Preferably, the actuating mechanism is disposed on the second distal portion of elongated member. When using a spring hinge to connect the first and second members, the members typically open from a closed position to an open position with respect to one another through engagement of the actuating mechanism and thereafter rapidly return to the closed position. When in the closed position, the first and second members collectively define a rigid compartment such that one or more insects can be trapped between the first and second members. Typically, to permanently maintain the trapped insects in the rigid compartment, the device also includes a sticky surface on at least a portion of the interior of the compartment.

In accordance with the present invention, there is provided a versatile we easy to use device for catching insects in a variety of settings. The device comprises an elongated member having a first and a second distal portion. An insect trapping head is mounted on the first distal portion and includes a first member and a second member pivotally mounted with respect to each other, preferably by a spring hinge. The first and second members are moveable between one of an open or closed position and the other of an open or closed position by an actuating mechanism. Preferably, the actuating mechanism is disposed on the second distal portion of the elongated member. When using a spring hinge to connect the first and second members, the members typically open from a closed position to an open position with respect to one another through engagement of the actuating mechanism and thereafter rapidly return to the closed position. When in the closed position, the first and second members collectively define a rigid compartment such that one or more insects can be trapped between the first and second members. Typically, to permanently maintain the trapped insects in the rigid compartment, the device also includes a sticky surface on at least a portion of the interior of the compartment.

In accordance with another aspect of the present invention, at least one of, and preferably both of the first and second members, include a sticky surface secured to a bottom interior portion of each member. By "secured to," it is meant that the sticky surface is integral with one or both of the first and second members or is indirectly secured to the first and/or second members by any suitable member or method known in the art. The sticky surface may include an adhesive such as, for example, an adhesive gel, adhesive tape, adhesive strips, or an adhesive member such as those adhesive cards sold commercially under the name Sensor Cards, manufactured by Whitmire Micro-GEN Research Laboratories, Inc. Alternatively, any other suitable material having adhesive properties may be used which can be maintained within the compartment.

In accordance with yet another aspect of the present invention, the first and second members each include a releasement member associated with a sticky surface of each member. Each releasement member extends from an interior portion of the first and second members to an exterior portion of the first and second members. When deployed by a user, the releasement members enable a sticky surface of one member to contact the sticky surface of the other member. Thus, the present invention enables one to dispose of trapped insect(s) within the compartment of the trapping head without handling the insect(s) for the sanitary capture and disposal of the insect(s).

In one particular construction of the present invention, each of the first and second members includes a sticky surface which comprises a single adhesive member, such as the Sensor Card described previously, directly or indirectly secured to a planar backing such as a rectangular cardboard member. Each of the first and second members preferably include a releasement member, such as a two-prong clasp, and preferably a pair of two-prong clasps which extend from the planar backing within the interior of each of the first and second members to an exterior of the first and second members. When in use, the prongs of the clasp are opened in a direction out and away from the base of the clasp to maintain the adhesive members within their respective member. The prongs of each clasp may subsequently be moved into a substantially parallel relationship to one another such that the adhesive member of one of the first and second members may contact the adhesive member of the opposed first or second member. The two adhesive members mate with one another with the trapped insect(s) held between the adhesive members. Thereafter, the adhesive members with the trapped insect(s) may be collectively disposed of.

In accordance with another aspect of the present invention, engagement of the actuating mechanism of the device opens one of the first and second members from about 0 to about 340 degrees relative to the other member, and preferably to about 270 degrees relative to the other member. The spring hinge thereafter enables the first and second members to thereafter rapidly close with respect to one another. Typically, the actuating mechanism includes a trigger mechanism which is disposed on the second distal portion of the elongated member. The trigger mechanism may be of any shape such that the trigger mechanism is easily engageable by the thumb and/or fingers of the user. In one embodiment, at least a portion of the trigger mechanism is disposed within a recess which extends longitudinally within at least a portion of the elongated member adjacent a handle on the second distal portion.

In accordance with yet another embodiment of the present invention, the elongated member comprises an elongated rod having a bore. The device further includes a tensioned line or other thin, elongated member which travels from the trigger mechanism to a spring hinge pivotally connecting the first and second members. Preferably, the tensioned line or thin, elongated member travels through the bore of the elongated rod. The tensioned line may be at least one of fishing line, monofilament line, or other thin, relatively rigid material. If a thin, elongated member is used, the thin, elongated member may be a thin, elongated rod formed from plastic, metal, or any other suitable relatively rigid material. Typically, the tensioned line is coiled around the spring hinge and may be directly or indirectly secured to the spring hinge by any suitable structure or method. Engagement of the trigger mechanism causes the tensioned line to open one member from about 0 to about 340 degrees relative to the other member, and preferably to about 270 degrees relative to the other member. When using a spring hinge to connect the first and second members, the members rapidly move to the closed position after initially being opened by actuation of the trigger mechanism.

In another embodiment, the actuating mechanism includes a slider mechanism disposed on the second distal portion of the elongated member which when moved rearward by a user causes one of the first and second members to move from a closed position to an open position with respect to the other member. The spring hinge enables the members to rapidly return to the closed position after being opened by actuation of the slider mechanism. The slider mechanism may include a knob and a male member. The Knob is engageable by the thumb or fingers of the user and the male member extends into a bore of the elongated member. The bore includes a groove, which is preferably angled, in which the male member can be selectively maintained within to fix the first and second members in the open position as desired, preferably with the second member opened to about 270 degrees with respect to the first member. To return the first and second members to a closed position, the male member can be moved in an upward direction out of the groove and back into the bore of the elongated member.

Alternatively, the actuating mechanism may include any other suitable structure which enables one of the first and second members to open from one of an open position and a closed position to the other of the open or closed positions by an actuating mechanism from about 0 to about 340 degrees relative to the other member, and preferably to about 270 degrees relative to the other member.

In accordance with another aspect of the present invention, a body of one or both of the first and second members includes a plurality of air holes, preferably around a perimeter on the rear side of the member(s), to decrease air resistance when the device is used. Alternatively, at least one of the first and second members may include a screened portion also to decrease air resistance to the device when in use. Additionally, the top edge of a perimeter of at least one of the first and second members may include a rubber portion to protect the edges of the members and to protect walls or other surfaces when the members are in contact with such surfaces. Further, the top edge of a perimeter of at least one of the first and second members may include a plurality of bristles to enable the member(s) to be used to sweep debris away from a surface as desired.

Other advantages and features of the invention will become apparent from the following description and from reference to the drawings.

BRIEF DESCRIPTION OF THE DRAWINGS

FIG. 1 is a perspective view of one embodiment of a device in accordance with the invention in the opened position;

FIG. 2 is a side elevation view along line 2—2 of FIG. 1 showing the movement of the second member relative to the first member of the trapping head;

FIG. 3 is a perspective cut-away view of the device of FIG. 1 illustrating the first and second members in a closed position and a fly trapped within the compartment of the trapping head;

FIG. 4 is a side elevation, fragmentary view along line 4—4 of FIG. 3 illustrating the first and second members in a closed position, an actuating mechanism, and an adhesive member secured to each of the first and second members;

FIG. 5 is a perspective, schematic view showing the assembly of the components of the device of FIG. 1 in accordance with the present invention;

FIG. 8 is a side elevation view of another embodiment of a device in accordance with the present invention;

FIG. 9 is a perspective view of yet another embodiment of the device having a slider mechanism in accordance with the present invention;

FIG. 10 is a perspective, fragmentary view of the device of FIG. 1 having a plurality of air holes in both of the members; and FIG. 11 is a perspective view of the device of FIG. 1 having a plurality of bristles about a perimeter of the second member and being in an opened position to capture insect(s) resting on a flat surface.

DETAILED DESCRIPTION OF THE INVENTION

Figure 6:
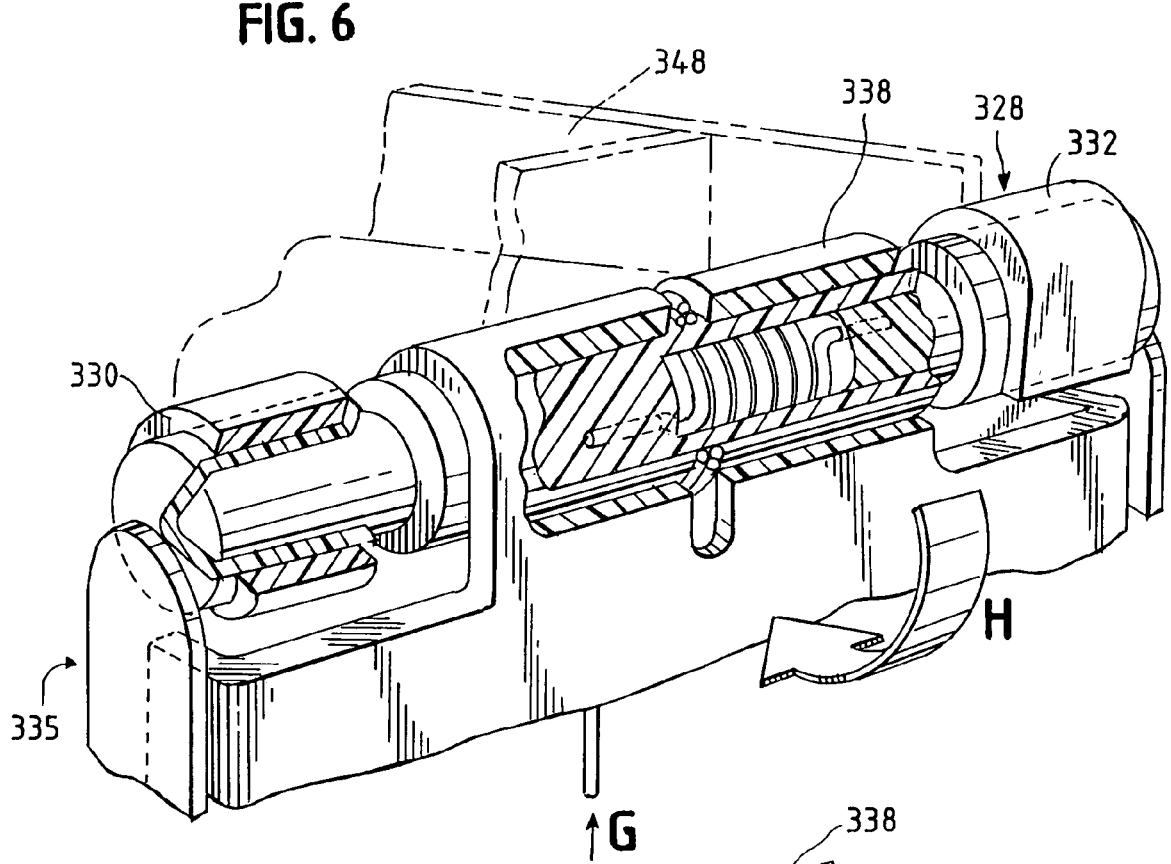
FIG. 6 is a perspective, fragmentary view showing the structure of a spring hinge and movement of the spring hinge and the second member relative to the first member upon triggering of the actuating mechanism in accordance with the present invention.

While this invention is susceptible of embodiment in many different forms, there is shown in the drawings and described in detail herein, several specific embodiments with the understanding that the present disclosure is to be considered as exemplifications of the principles of the invention and is not intended to limit the invention to the embodiments illustrated.

Now referring to the drawings, a device 10 for catching insects in accordance with the present invention is shown generally in FIG. 1 as including an elongated member 12, an insect trapping head 14, and an actuating mechanism 16. Elongated member 12 has a first distal portion 18 and a second distal portion 20. Typically, as shown in FIG. 2, elongated member 12 comprises an elongated rod having a bore 21. Elongated member 12 may be formed from aluminum, steel, durable plastic, or any other relatively rigid material, and is preferably about 24 inches in length. Preferably, elongated member 12 includes a handle 22 on second distal portion 20 for easy gripping of device 10.

As shown in FIGS. 1–4, insect trapping head 14 is mounted on first distal portion 18 of elongated member 12 and includes a first member 24 and a second member 26 pivotally mounted with respect to each other, preferably by a spring hinge 28. First member 24 may be mounted on elongated member 12 by any suitable structure such as rivets, screws, fasteners, or the like. In one embodiment, as shown in FIG. 5, first member 24 is mounted on elongated member 12 via a pair of brackets 13, which are fixed in place by fitting screws 15 through corresponding apertures 17a in brackets and apertures 17b of first member 24. Alternatively, first member 24 may be integrally formed with elongated member 12.

Spring hinge 28 provides a pivotal attachment for first member 24 and second member 26 and additionally enables second member 26 to open with respect to first member 24 from a closed position 30, as shown in FIGS. 3–4, to an open position 32, as shown in FIGS. 1–2, and thereafter rapidly return to closed position 30.

In one embodiment of spring hinge 28 of device 10, spring hinge 28 includes a pair of opposed apertures in each of opposed side walls of first member 24 and second member 26. Apertures 19a, 19b of first member 24 are aligned with a corresponding one of apertures 23a, 23b of second member 26. A first end 25 of spring hinge 28 is positioned within one set of mating apertures 19a, 23a and a second end 27 of spring hinge 28 is positioned between the opposed set of apertures 19b, 23b. Pin 35 is positioned through mated apertures 19a, 23a and 19b, 23b and a bore 37 through spring hinge 28. Second member 26 is preferably indirectly secured to tube 33 of spring hinge 28. The members 24, 26 can thereafter be opened and closed with respect to one another.

Figure 7:
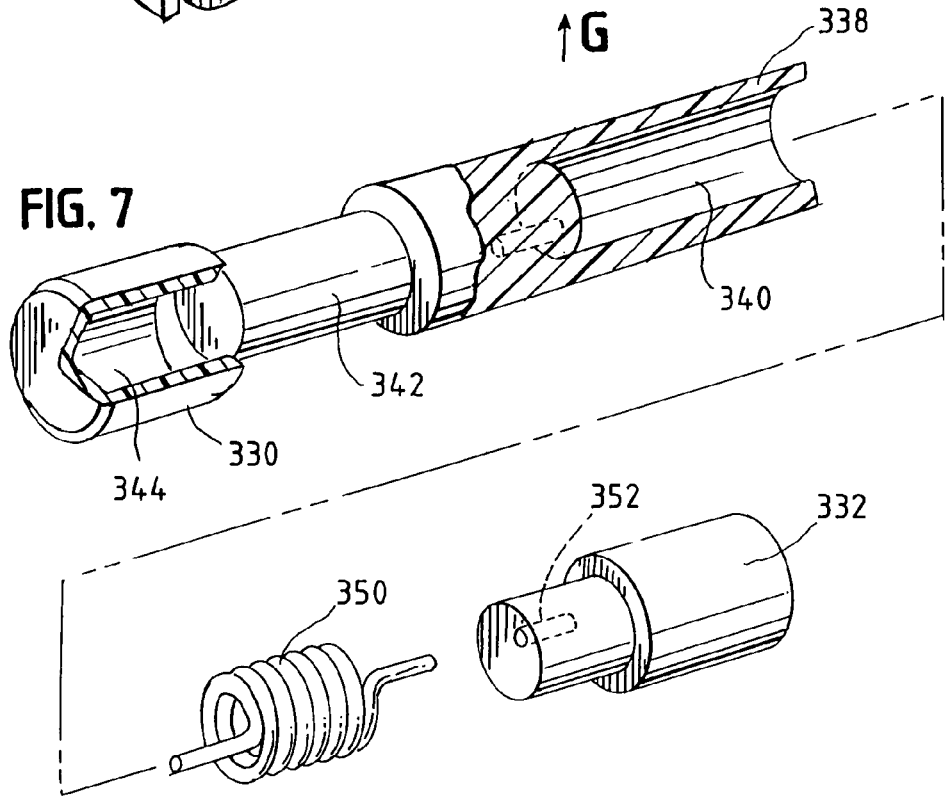
FIG. 7 is a perspective view of the spring hinge of FIG. 6 showing the assembly of the spring hinge in accordance with the present invention.

In another aspect of the invention, as shown in FIGS. 6–7, spring hinge 328 typically includes a first securement member 330 and a second securement member 332, each of which are directly or indirectly connected to first member 334 of trapping head 335 by screws, rivets, adhesive, clamps, or any other suitable structure or is integrally formed therewith. First securement member 330 is preferably hollow and second securement member 332 is preferably substantially solid, but includes an aperture 336. A half-solid, half-hollow tube 338 having a hollow portion 340 is positioned between first and second securement members 330, 332, typically by mating a male portion 342 of tube 338 with a female portion 344 of first securement member 330 and mating hollow portion 340 of tube 338 with a male portion 346 of second securement member 332. When assembled, tube 338 may freely rotate relative to first and second securement members 330, 332. Second member 348 is also typically directly or indirectly fixedly connected to tube 338 by any suitable structure and thus may also rotate and move freely along with tube 338 relative to first and second securement members 330, 332.

Hollow portion 340 is sized to fit a portion of male portion 346 and spring structure 350 therein. Second securement member 332 also includes a void 352 or hollow portion for accepting a portion of spring 350. Spring 350 is housed within hollow portion 340 of tube 338 and typically extends parallel to a center axis of spring hinge 328. It is contemplated that winding up and preloading spring 350 before enclosing the spring 350 within hollow portion 340 via second securement member 332 will provide enough springload to rapidly close and hold insect trapping head 335 in a closed position.

When in closed position 30, first member 24 and second member 26 collectively define a rigid compartment 34 in which insect(s) can be trapped as in FIG. 3. To trap the insect within rigid compartment 34, second member 26 is initially moveable between closed position 30 and open position 32 and thereafter rapidly returned back to closed position 30. In particular, second member 26 may be opened between about 0 to about 340 degrees relative to first member 24, and more preferably opened from closed position 30 to about 270 degrees relative to first member 24 in the direction shown by arrow A in FIG. 1 and thereafter returned from open position 32 to closed position 30.

In one construction of device 10, as shown in FIG. 1, first member 24 includes at least one pair of opposed side walls 36a, 36b and second member 26 includes at least one pair of opposed side walls 38a, 38b. When device 10 is in closed position 30, at least a portion of the at least one pair of opposed side walls 38a, 38b of second member 26 is in overlapping relation with at least a portion of the at least one pair of opposed side walls 36a, 36b of first member 24, as shown in FIGS. 3–4. Rigid compartment 34, defined between members 24, 26, is of a sufficient size to capture and maintain numerous insects, whether large or small, therein. While it is preferred that members 24, 26 have a rectangular shape to form a rectangular-shaped rigid compartment as shown in the figures, it is contemplated that first and second members 24, 26 may be of any other shape such that a rigid compartment having a depth may be formed by the trapping members. For example, both members may be concave shaped to form a concave-shaped compartment. Typically, however, first and second members 24, 26 are of a substantially similar shape.

To maintain an insect within compartment 34 and to ready the insect(s) for disposal, rigid compartment 34 includes a sticky surface on at least an interior portion of compartment 34. Preferably, an interior portion 40a of first member 24 and interior portion 40b of second member 26 each include a sticky surface. In particular, the sticky surfaces may comprise one of an adhesive gel, adhesive tape, adhesive strips, or any other material having adhesive properties which may be secured to an interior portion of the first and/or second member. By "secured to," it is meant that a sticky surface may be directly disposed on a surface of the interior portion of one or both of the first and second members or alternatively may be indirectly secured to one or both of the first and/or second members.

For example, in one construction of device 10, as shown in FIGS. 2, 4, and 5, first member 24 and second member 26 each include a removable adhesive member 42a, 42b, such as, the adhesive cards commercially sold under the name Sensor Cards, manufactured by Whitmire Micro-GEN Research Laboratories, Inc. Each adhesive member 42a, 42b includes sticky surfaces 44a, 44b respectively on at least one side thereof, and preferably on two sides thereof. Typically, as shown in FIG. 5, adhesive members 42a, 42b are secured to a corresponding planar backing 46a, 46b which is preferably cardboard but may be any other relatively rigid material which can be directly or indirectly secured to an interior of the members. When adhesive members 42a, 42b have a sticky surface 44a, 44b on each side thereof, one of the sticky surfaces on each adhesive member 42a, 42b faces the interior of compartment 34 when device 10 is fully assembled. The other sticky surface on each of adhesive members 42a, 42b facilitates securement of the adhesive members 42a, 42b to its corresponding planar backing 46a, 46b.

Typically, first member 24 and second member 26 include at least one releasement member, and preferably at least two releasement members associated with each adhesive member 42a, 42b. As shown in FIGS. 2, 4 and 5, first member 24 includes a pair of two-prong clasps 48a, 48b and second member 26 includes a pair of two-prong clasps 49a, 49b, the prongs of which extend through apertures 52 in adhesive members 42a, 42b and apertures 53 in planer backings 46a, 46b from interior 40a, 40b of members 24, 26 respectively to an exterior portion 50a, 50b of members 24, 26 respectively. To maintain adhesive members 42a, 42b within members 24, 26 respectively, the prongs of each clasp are bent out and away from the exterior 50a, 50b of each member 24, 26, as shown by arrow E in FIG. 4. By including two horizontally spaced apart clasps on each of the first and second members 24, 26 of trapping head 14, the prongs are easily moved together and apart without interference of the elongated member 12. Alternatively, an adhesive member may be detachably or permanently maintained within an interior of a corresponding member by mating snap fittings, mating hook and loop fasteners, mating male-female connectors, or any other suitable structure which enables an adhesive member to be releasably connected to one of the members of trapping head 14.

Actuating mechanism 16 of device 10 enables second member 26 to open with respect to first member 24 when engaged by a user in the direction shown by arrow A in FIGS. 1–2. In one embodiment of device 10, as shown in FIGS. 1–5, actuating mechanism 16 preferably includes a trigger mechanism 54 on second distal portion 20 of elongated member 12 and a tensioned line 56 or another thin, elongated member which extends from spring hinge 28 to trigger mechanism 54 to enable first and second members 24, 26 to be moved from closed position 30 to open position 32. The members 24, 26 are capable of trapping insect(s) defined between members 24, 26 when members 24, 26 are rapidly opened in compartment 34 from closed position 30 by engagement of trigger mechanism 54 and thereafter are rapidly shut to closed position 30.

Tensioned line 56 as shown in FIGS. 2 and 4 may be at least one of fishing line, monofilament line, thin wire, and a thin, plastic material, or any other relatively thin, rigid material. Alternatively, a thin, elongated member (not shown) may be utilized to provide the tensioned or relatively rigid connection between the members 24, 26 and actuating mechanism 16. The thin, elongated member may be formed from metal or plastic or any other thin, relatively rigid material. Tensioned line 56 typically extends from spring hinge 28 through bore 21 of elongated member 12 to trigger mechanism 54.

In one embodiment, as shown in FIGS. 6–7, typically tensioned line 356 is coiled around tube 338 of spring hinge 328 such that when actuating mechanism 16 is triggered, tensioned line 356 uncoils around tube 338 while spring 350 coils causing second member 348 to open with respect to first member 334. Additionally, when the actuating mechanism is released, tensioned line 356 recoils in the direction shown by arrow G while spring 350 uncoils enabling second member 348 to rapidly close with respect to first member 334 in the direction shown by arrow H. In the embodiment of device 10 shown in FIGS. 1–5, tensioned line 56 is also coiled around spring hinge 28. As a result, engaging trigger mechanism 54 in the direction of arrow B also causes tensioned line 54 to be pulled rearward in the direction of arrow F, as shown in FIG. 2, and also causes spring hinge 28 and second member 26 to rotate in the direction shown by arrow A. When the user releases the actuating mechanism or the actuating mechanism is otherwise released, spring hinge 28 and second member 26 are caused to rotate in the direction shown by arrow C in FIG. 2 and members 24, 26 are moved into closed position 30.

Trigger mechanism 54 may be of any suitable shape which enables the thumb or finger(s) of the user to engage a portion of the body of trigger mechanism 54. Additionally, trigger mechanism 54 may be formed from any relatively rigid material such as molded plastic or metal. Specific embodiments of the trigger mechanism will be discussed in greater detail below.

In one construction of device 10, illustrated in FIG. 5, trigger mechanism 54 of device 10 is pivotally mounted to elongated member 12 by a pin 37, a screw, or other fastening device, which is fitted through apertures 59 in handle 22 and fastened by a bolt (not shown). Tensioned line 56 is secured to the trigger mechanism 54 by any suitable fastener or method of fastening, preferably by tying the line through an aperture 60 in trigger mechanism 54, as shown in FIG 4. For aesthetic purposes and to protect trigger mechanism 54, device 10 may include guard portions 66a, 66b on handle 22 on each respective side of trigger mechanism 54. Tensioned line 56 is typically attached on trigger mechanism 54 at a location such that the tension of line 56 is maximized. Further, it is desirable for tensioned line 56 to be secured on trigger mechanism 54 at a location such that tensioned line 56 moves in generally in the same direction as, and along with, trigger mechanism 54 to cause second member 26 to open with respect to first member 24, as shown by arrow A in FIG. 2. Typically, elongated member 12 includes a pin located transversely across the bore of elongated member 12 near handle 22, which guides and reduces drag or slipping of tensioned line 56 when trigger mechanism 54 is engaged by a user.

Additionally, trigger mechanism 54 includes a male portion 62 which extends from elongated member 12, and which is engageable by the user in the direction shown by arrow B, as shown in FIGS. 1–3. Engagement of the trigger mechanism 54 in the direction of arrow B pulls tensioned line 56 rearward, which causes tube 19 of spring hinge 28 to rotate. Due to the coiling of tensioned line 56 around spring hinge 28, rotation of spring hinge 28 will also rotate second member 26 in the direction shown by arrow A shown in FIG. 1, causing second member 26 to open with respect to first member 24. Thereafter, upon releasing engagement of trigger mechanism 54 in the direction, as shown by arrow D in FIG. 2, tensioned line 56 will move in the direction of arrow O, as shown in FIG. 2, and tube 33 of spring hinge 28 will rotate in the direction of arrow C, as shown in FIG. 3, causing second member 26 to rapidly close with respect to first member 24 when trigger mechanism 54 is disengaged or released.

In another construction of the device, as shown in FIG. 8, actuating device 101 of device 100 includes a trigger mechanism 102 having a generally horizontal portion 104 and an angled gripping portion 106 located on a second distal portion 108 of an elongated member 110, which is preferably an elongated rod having a bore 120. A recess 112 extends longitudinally within at least a portion of elongated member 110 adjacent a handle 114 toward a first distal portion 116 of elongated member 110. A tensioned line 118 extends through bore 120 of elongated member 110 from spring hinge 122 to trigger mechanism 102. Typically, tensioned line 118 is coiled around the spring hinge 122 and is of a sufficient tension such that engagement of trigger mechanism 102 in the direction by arrow M moves tensioned line 56 downward and rearward in the direction shown by arrow L and enables second member 126 to open from about 0 degrees relative to first member 124 to about 270 degrees relative to second member 126 in the direction of arrow J. Thereafter, second member 126 may "spring back" in the direction of arrow K to a closed position wherein second member 126 is about 0 degrees relative to first member 124. Within bore 120 of elongated rod 110, at least one pin 130 may be inserted normal to and below tensioned line 118 such that tensioned line 118 travels over pin 130 to reduce drag and friction of tensioned line 118 when trigger mechanism 102 is engaged.

In yet another embodiment, as shown in FIG. 9, actuating mechanism 201 of device 200 includes a slider mechanism 202 which when moved rearward as shown by arrow N similarly opens second member 204 with respect to the first member 206 of insect trapping head 207. Slider mechanism 202 also provides the optional feature of enabling the trapping head to be maintained in an opened position, preferably wherein second member 204 is maintained in an open position about 270 degrees relative to first member 206. To maintain the members 204, 206 in an opened position, slider mechanism 202 may include a knob 208 and a male member 210. Knob 208 is engageable by the thumb or fingers of the user and male member 210 extends into bore 212 of elongated member 214. Bore 212 includes a notch 216 within which male member 210 may be pressed downward into and maintained therein to fix the first member 204 and second member 206 in an open position as desired. Typically, notch 216 is relatively narrow and is preferably disposed at about 45 degrees relative to the central axis of bore 212 and extends toward the first distal portion 218 of elongated member 214. To return first member 206 and second member 204 into a closed position, male member 210 can be moved in an upward direction out of notch 216 and back into bore 212 of elongated rod 214.

Additionally, one or both of first member 24 and second member 26 may include a plurality of air holes 64 in the body of first and second members 24, 26, preferably around a perimeter of the body of members 24, 26 as shown in FIG. 10. The air holes are preferably of a size sufficiently small such that none or an insubstantial number of any captured insects will escape from compartment 34 of trapping head 14. In particular, air holes 64 aid to decrease the amount of air resistance to trapping head 14 when in use. Thus, when actuated, trapping head 14 may open and/or close even more rapidly with air holes 64 than without air holes 64. In another embodiment, one of the trapping members, and preferably second trapping member 26, may include a screened portion (not shown) to similarly decrease the amount of air resistance of trapping head 14 when in use.

In another aspect of the invention, the top edge of a perimeter of at least one of the first and second members 24, 26 may include a rubber portion (not shown). As such, when device 10 is opened such that one member 26 is opened approximately about to 270 degrees relative to the other member 24, the device may be used to collect insect(s) in hard to reach places such as an upper portion of a wall or a ceiling without damaging such surfaces. For such use, it is also contemplated that handle 22 of device 10 may be extendable such as by a telescoping extension (not shown) or any other attachment or structure which selectively increases the length of the elongated member. In another embodiment, the top edge of a perimeter of either or both of first member 24 and second member 26 may include a plurality of bristles 66, as shown in FIG. 11.

In operation, the device 10 for catching insects works as follows. First, in an embodiment using the adhesive members 42a, 42b described above, the user secures adhesive members 42a, 42b to first and second members 24, 26 respectively by fitting the prongs of each two-prong clasp 48a, 48b and 49a, 49b through apertures 52 of adhesive members 42a, 42b and apertures 53 of planar backings. 46a, 46b, as shown in FIG. 5. Adhesive members 42a, 42b are thereafter maintained in their respective members 24, 26 by spreading the prongs of the clasps out and away from one another as shown by arrow E in FIG. 4. The device 10 is now fully assembled and ready for use.

When the user sees the targeted insect in flight, for example, the user may engage the trigger mechanism 54 which opens second member 26 with respect to first member 24, as shown in FIG. 1. In particular, engagement of the trigger mechanism 54 causes tensioned line 56 to rotate spring hinge 28 and open second member 26 relative to the first member 24 in the direction shown by arrow A, preferably from about 0 degrees relative to first member 24 to about 270 degrees relative to first member 24. Once opened by the trigger mechanism 54, tensioned line 56 and spring hinge 28 enable the members 24, 26 to rapidly close with respect to each other to capture the insect between members 24, 26, as shown in FIG. 2.

When the user desires to discard the captured insect(s), the prongs of clasps 48a, 48b and 49a, 49b may be moved back into a substantially parallel relationship in the opposite direction of arrow E of FIG. 4 such that one of adhesive members 42a, 42b is free and can move into contact with the opposed one of adhesive members 42a, 42b. Adhesive members 42a, 42b then stick together with the collected insect(s). The user can then open members 24, 26 with respect to one another again by engaging the actuating mechanism 54 and the mated adhesive members 42a, 42b can be discarded and replaced.

To capture an insect resting on a flat surface, first member 24 and second member 26 can be maintained in about 270 degree relation to one another by maintaining trigger mechanism 54 in an engaged position. Alternatively, if the device has a slider mechanism 202 as described above for maintaining the first and second members in a fixed position, the members may be maintained in a fixed hands-free open position, preferably about 270 degrees from one another by maintaining knob 208 of device 200 within notch 216 as described previously. To capture the insect on a flat surface such as a wall ceiling or window, the exterior of second member 26 is placed against the flat surface and the insect is maintained within the sticky surface of adhesive member 42b on second member 26, as shown in FIG. 11.

While the invention has been described with respect to certain preferred embodiments, it is to be understood that the invention is capable of numerous changes, modifications, and rearrangements without departing from the scope or spirit of the invention as defined in the claims.

We claim:

1. A device for catching an insect comprising:
an elongated member having proximal and distal portions;
an insect trapping head mounted on said distal portion, said insect trapping head including a first member and a second member pivotally mounted with respect to each other around a pivot axis disposed at an end of said elongated member furthest from said proximal portion to render the insect trapping head moveable between an open position and a closed position, said first and second members defining a rigid compartment and having an interior wall, such that when the insect trapping head is in a closed position, the insect can be trapped between said first and second members, one of said first or second members of said insect trapping head being capable of pivoting an open position through an angle of from between 270 and 340 degrees; and an actuating mechanism disposed at said proximal portion for providing actuating movement of said insect trapping head between one of the open and closed positions and the other of the open and closed positions, wherein, when the actuating mechanism is not actuated, the insect trapping head is in said closed position.

2. The insect catching device of claim 1 wherein said first and second members each include at least one pair of opposed side walls and a sticky surface on at least a portion of the interior wall of the compartment.

3. The insect catching device of claim 2 wherein at least a portion of the at least one pair of opposed side walls of one member is in overlapping relation within at least a portion of the at least one pair of opposed side walls of the other member.

4. The insect catching device of claim 3 wherein at least a portion of the interior bottom portion of each of the first and second members includes a sticky surface.

5. The insect catching device of claim 4 wherein said sticky surface of said first and second members includes at least one removable adhesive member having adhesive on at least one side thereof.

6. The insect catching device of claim 5 wherein each of said first and second members each include a releasement member associated with the sticky surface of each member, said releasement members extending from an interior portion of each member to an exterior wall portion of each member, said releasement members enabling a sticky surface of one member to contact the sticky surface of the other member when said releasement members are deployed.

7. The device of claim 1 wherein said actuating mechanism includes a spring hinge connecting the first and second members tending to bias said members to a closed position.

8. The device of claim 1 wherein said actuating mechanism includes a trigger mechanism on said proximal portion and at least one of a thin, elongated member and a tensioned line extending from said trigger mechanism to said insect trapping head.

9. The insect catching device of claim 8 wherein said elongated member includes a bore and said device further comprises a tensioned line extending from said trigger mechanism to said insect trapping head through said bore.

10. The insect catching device of claim 1 wherein said actuating mechanism includes a stopping mechanism for maintaining said first and second members in the open position.

11. The insect catching device of claim 1 wherein a top edge of a perimeter of at least one of said first and second members includes a rubber portion.

12. The insect catching device of claim 1 wherein at least one of said first and second members includes a screen portion.

13. The insect catching device of claim 8 wherein said actuating mechanism includes a stopping mechanism for maintaining said first and second members in the open position against the biasing force of the spring.

14. A system for catching an insect comprising an adhesive member and a device for catching an insect, said device for catching an insect comprising:

an elongated member having proximal and distal portions;

an insect trapping head mounted on said first distal portion, said insect trapping head including a first member and a second member pivotally mounted with respect to each other around a pivot axis disposed at an end of said elongated member furthest from said proximal portion to render the insect trapping head moveable between an open position and a closed position, said open position being capable of pivoting to between 270 degrees and 340 degrees from said closed position, said first and second members defining a rigid compartments, wherein when said actuating mechanism is not actuated, the insect trapping head is in said closed position, such that the insect can be trapped between said first and second members;

said adhesive member comprising:

a planar backing having a first or second surface;

a sticky surface on at least one of the first and second surfaces; and at least one clasp member extending from a first side of said planar backing through to a second side of said planar backing for removably securing said adhesive member to one of said first and second members.

* * * * *

UNITED STATES PATENT AND TRADEMARK OFFICE
CERTIFICATE OF CORRECTION

PATENT NO. : 7,165,355 B2
APPLICATION NO. : 10/919143
DATED : January 23, 2007
INVENTOR(S) : David Michael George and Ryan Bruce Johnson It is certified that error appears in the above-identified patent and that said Letters Patent is hereby corrected as shown below:

In column 1, line 43, before "elongated" insert -- the --;
 column 1, lines 55 to 67 extending to column 2, line 10, delete the whole paragraph as redundant.

In column 2, after line 10, insert the following paragraph:

-- In accordance with another aspect of the present invention, each of the first and second members includes at least one pair of opposed side walls. Preferably, at least a portion of at least one pair of opposed side walls of one member is in overlapping relation with at least a portion of at least one pair of opposed side walls of the other member when the device is in the closed position. As a result, the device preferably has a rectangular or square shaped rigid compartment within which insects(s) may be trapped. Alternatively, the first and second members may be of any other shape and are preferably of the same or of a substantially similar shape as one another. --

In column 3, line 40, change "Knob" to -- knob --

In column 6, line 34, delete "24,26".

In column 8, line 17, change "37" to -- 37a --.

In the claims:

Claim 14 - Column 12, lines 33 and 34, change "compartments" to --compartment --.

Signed and Sealed this

Tenth Day of April, 2007

JON W. DUDAS
*Director of the United States Patent and Trademark Office*